United States Patent
Deng et al.

(10) Patent No.: US 10,459,799 B2
(45) Date of Patent: Oct. 29, 2019

(54) RECOVERY CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jun-Yi Deng, Wuhan (CN); Chun-Sheng Chen, New Taipei (TW)

(73) Assignees: HONGFUJIN PRECISION INDUSTRY (WUHAN) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 151 days.

(21) Appl. No.: 15/661,255

(22) Filed: Jul. 27, 2017

(65) Prior Publication Data

US 2018/0260277 A1 Sep. 13, 2018

(30) Foreign Application Priority Data

Mar. 13, 2017 (CN) .......................... 2017 1 0147334

(51) Int. Cl.
*G06F 11/14* (2006.01)
*G06F 13/40* (2006.01)

(52) U.S. Cl.
CPC ........ *G06F 11/142* (2013.01); *G06F 13/4022* (2013.01); *G06F 2201/805* (2013.01)

(58) Field of Classification Search
CPC .................................................... G06F 11/142
See application file for complete search history.

(56) References Cited

U.S. PATENT DOCUMENTS

| | | | | |
|---|---|---|---|---|
| 6,728,896 B1* | 4/2004 | Forbes | .................. | G06F 11/203 714/11 |
| 6,754,855 B1* | 6/2004 | Denninghoff | ......... | G06F 9/4406 714/25 |
| 7,000,231 B1* | 2/2006 | Gold | ......................... | G06F 8/63 711/173 |
| 7,409,536 B2* | 8/2008 | Guo | ...................... | G06F 9/4843 713/1 |
| 2001/0044817 A1* | 11/2001 | Asano | .................... | G06F 9/5011 718/100 |
| 2004/0153724 A1* | 8/2004 | Nicholson | ........... | G06F 11/0709 714/6.11 |
| 2005/0172294 A1* | 8/2005 | Kanemura | .............. | G06F 9/441 718/107 |
| 2007/0174689 A1* | 7/2007 | Chen | ................... | G06F 11/1417 714/13 |

(Continued)

*Primary Examiner* — Yolana L Wilson
(74) *Attorney, Agent, or Firm* — ScienBiziP, P.C.

(57) ABSTRACT

A circuit allowing self-recovery of an operating system (OS) includes a PCH chip, a switch chip, a first ROM, a second ROM, a connector, and a storage unit. The switch chip, the second ROM, and the connector are coupled to the PCH chip. The first ROM is coupled to the PCH chip through the switch chip. The second ROM controls the PCH chip to output a signal according to the state of the operating system. The first ROM stores a backup the operating system. The switch chip receives control signal from the PCH chip, and controls whether the first ROM communicates with the PCH chip, to allow recovery of the entire or part of the OS in the event that repair is required.

15 Claims, 2 Drawing Sheets

(56) References Cited

U.S. PATENT DOCUMENTS

| | | | |
|---|---|---|---|
| 2009/0063845 A1* | 3/2009 | Lin | G06F 1/3203 |
| | | | 713/100 |
| 2012/0131318 A1* | 5/2012 | Zhan | G06F 11/1417 |
| | | | 713/2 |
| 2014/0122749 A1* | 5/2014 | Ting | G06F 13/4022 |
| | | | 710/14 |
| 2015/0012739 A1* | 1/2015 | Yang | G06F 9/50 |
| | | | 713/100 |

* cited by examiner

RECOVERY CIRCUIT

FIELD

The subject matter herein generally relates to recovery circuit.

BACKGROUND

An operating system can be damaged when the computer is abruptly powered off during operations. Then, reinstallation from an external source is needed to recover the operating system. Improvements in the art is preferred.

BRIEF DESCRIPTION OF THE DRAWINGS

Implementations of the present disclosure will now be described, by way of example only, with reference to the attached figures.

DETAILED DESCRIPTION

Figure 1:
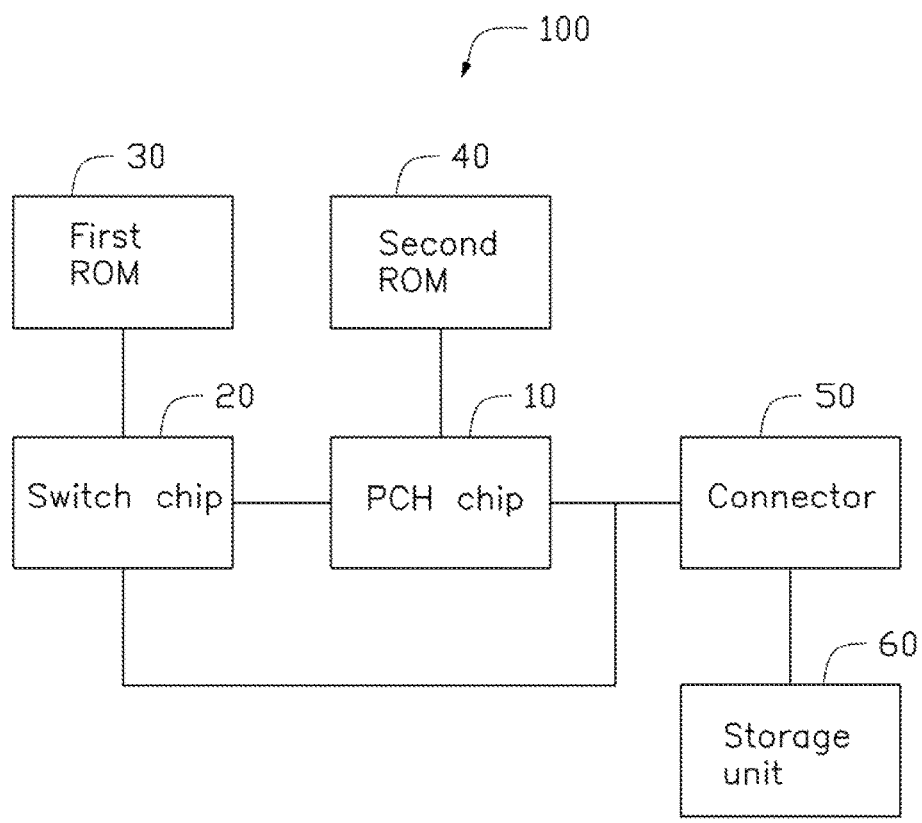
FIG. 1 is a schematic diagram of an exemplary embodiment of a recovery circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a recovery circuit 100 of an exemplary embodiment. The recovery circuit 100 is used in a computer system.

The recovery circuit 100 comprises a platform controller hub (PCH) chip 10, a switch chip 20, a first read-only memory (ROM) 30, a second ROM 40, a connector 50, and a storage unit 60. The switch chip 20, the second ROM 40, and the connector 50 are electrically coupled to the PCH chip 10. The first ROM 10 is electrically coupled to the PCH chip 10 through the switch chip 20.

In the illustrated exemplary embodiment, the connector 50 is a serial advanced technology attachment (SATA) device.

The storage unit 60 stores an operating system. The PCH chip 10 installs or reinstalls the operating system of the storage unit 60 through the connector 50.

In at the illustrated exemplary embodiment, the storage unit 60 is a hard disk.

The second ROM 40 controls the PCH chip 10 to output a switching signal according to the state of the operating system. The first ROM 30 stores a backup operating system. The switch chip 20 receives a switching signal from the PCH chip 10, and controls whether the first ROM 40 communicates with the PCH chip 10.

When the operating system of the storage unit 60 needs to be repaired, the second ROM 40 controls the PCH chip 10 to output a switching signal at a high-voltage level, such as logic 1, to turn on the switch chip 20. The first ROM 30 communicates with the PCH chip 10, and the PCH chip 10 recovers the operating system from the first ROM 30.

Figure 2:
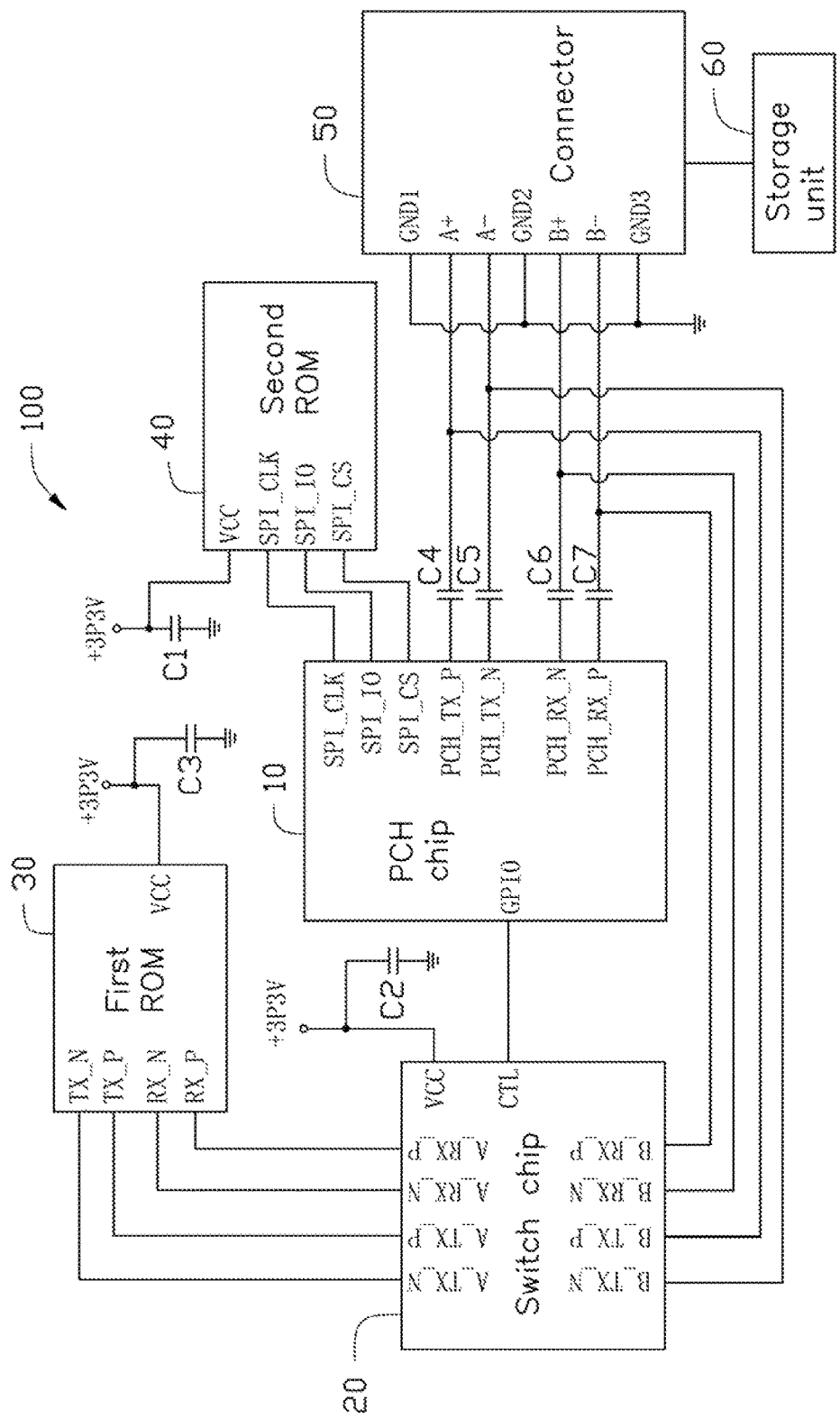
FIG. 2 is a circuit diagram of an exemplary embodiment of the recovery circuit.

FIG. 2 illustrates a circuit diagram of an exemplary embodiment of the recovery circuit 100.

A first signal pin SPI_CLK, a second signal pin SPI_IO, and a third signal pin SPI_CS of the second ROM 40 are electrically coupled, respectively, to a first signal pin SPI_CLK, a second signal pin SPI_IO, and a third signal pin SPI_CS of the PCH chip 10. A power pin VCC of the first ROM 40 is electrically coupled to a power supply +3P3V, and is grounded through a capacitor C1.

Three ground pins GND1-GND3 of the connector 50 are grounded. A first data pin A+ is electrically coupled to a first data pin PCH_TX_P of the PCH chip 10 through a capacitor C4. A second data pin A− is electrically coupled to a first data pin PCH_TX_N of the PCH chip 10 through a capacitor C5. A third data pin B+ is electrically coupled to a fourth data pin PCH_RX_N of the PCH chip 10 through a capacitor C6.

A fourth data pin B− is electrically coupled to a third data pin PCH_RX_P of the PCH chip 10 through a capacitor C7. The connector 50 is coupled to the storage unit 60 through a SATA cable.

A first data pin B_TX_P, a second data pin B_TX_N, a third data pin B_RX_P, and a fourth data pin B_RX_N of the switch chip 20 are electrically coupled, respectively, to a first data pin PCH_TX_P, a second data pin PCH_TX_N, a third data pin PCH_RX_P, and a fourth data pin PCH_RX_N of the PCH chip 10. A fifth data pin A_TX_P, a sixth data pin A_TX_N, a seventh data pin A_RX_P, and a eighth data pin A_RX_N of the switch chip 20 are electrically coupled, respectively, to a first data pin TX_P, a second data pin TX_N, a third data pin RX_P, and a fourth data pin RX_N of the first ROM 30.

A signal pin CTL of the switch chip 20 is electrically coupled to a general input and output pin GPIO of the PCH chip 10, to receive the switching signal from the PCH chip 10. A power pin VCC of the switch chip 20 is electrically coupled to the power supply +3P3V and is grounded through the capacitor C2.

A power pin VCC of the first ROM 10 is electrically coupled to the power supply +3P3V and is grounded through the capacitor C3.

When the operating system of the storage unit 60 is operating normally, the second ROM 40 controls the general input and output pin GPIO of the PCH chip 10 to output a low-voltage level, such as logic 0, to turn off the switch chip 20. The first ROM 30 will not communicate with the PCH chip 10. The computer system executes the operating system to function properly.

When the operating system of the storage unit 60 needs repair, the second ROM 40 controls the general input and output pin GPIO of the PCH chip 10 to output a high-voltage level, such as logic 1, to turn on the switch chip 20. The first ROM 30 communicates with the PCH chip 10, and the PCH chip 10 obtains the backup operating system from the first ROM 30 and installs all or part of the backup operating system. When the operating system is recovered, the second ROM 40 controls the general input and output pin GPIO of the PCH chip 10 to output a low-voltage level, to turn off the switch chip 20. The first ROM 30 will not communicate with the PCH chip 10.

Thus, it is possible to self-recover the operating system when the operating system so requires.

The exemplary embodiments shown and described above are only examples. Many details are often found in the art such as the other features of recovery circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A recovery circuit comprising:
   a storage unit storing an operating system;
   a first read-only memory (ROM) storing a backup operating system;
   a platform controller hub (PCH) chip executing the operating system; and;
      a second ROM controlling the PCH chip to output a switching signal according to a work state of the operating system;
      a switch chip electrically coupled between the first ROM and the PCH chip;
      the switch chip receiving the switching signal from the PCH chip; wherein the switch chip controls whether the first ROM communicates with the PCH chip;
   wherein when the operating system of the storage unit is in an abnormal state, the second ROM controls the PCH chip to output the switching signal at a high-voltage level to turn on the switch chip, wherein the first ROM communicates with the PCH chip, and the PCH chip recovers the operating system from the first ROM.

2. The recovery circuit of claim 1, wherein when the operating system of the storage unit is in a normal state, the second ROM controls the PCH chip to output the switching signal at a low-voltage level to turn off the switch chip, and the first ROM does not communicate with the PCH chip.

3. The recovery circuit of claim 1, wherein the recovery circuit further comprises a connector, and the PCH chip executes the operating system of the storage unit through the connector.

4. The recovery circuit of claim 3, wherein the connector is a serial advanced technology attachment (SATA).

5. The recovery circuit of claim 3, wherein a first signal pin, a second signal pin, and a third signal pin of the second ROM are electrically coupled to a first signal pin, a second signal pin, and a third signal pin of the PCH chip, respectively; a power pin of the first ROM is electrically coupled to a power supply, and is grounded through a first capacitor; wherein a first ground pin to a third ground pin of the connector are grounded, a first data pin is electrically coupled to a first data pin of the PCH chip through a second capacitor; wherein a second data pin is electrically coupled to a first data pin of the PCH chip through a third capacitor; wherein a third data pin is electrically coupled to a fourth data pin of the PCH chip through a fourth capacitor; and a fourth data pin is electrically coupled to a third data pin of the PCH chip through a fifth capacitor.

6. The recovery circuit of claim 5, wherein a first data pin, a second data pin, a third data pin, and a fourth data pin of the switch chip are electrically coupled to a first data pin, a second data pin, a third data pin, and a fourth data pin of the PCH chip, respectively; wherein a fifth data pin, a sixth data pin, a seventh data pin, and a eighth data pin of the switch chip are electrically coupled to a first data pin, a second data pin, a third data pin, and a fourth data pin of the first ROM, respectively; wherein a signal pin of the switch chip is electrically coupled to a general input and output pin of the PCH chip, to receive the switch control signal from the PCH chip; and wherein a power pin of the switch chip is electrically coupled to the power supply and is grounded through a sixth capacitor.

7. The recovery circuit of claim 6, wherein a power pin of the first ROM is electrically coupled to the power supply and is grounded through a seventh capacitor.

8. The recovery circuit of claim 1, wherein the storage unit is a hard disk.

9. A recovery circuit comprising:
   a storage unit storing an operating system;
   a first read-only memory (ROM) storing a backup operating system;
   a platform controller hub (PCH) chip executing the operating system; and
      a second ROM controlling the PCH chip to output a switching signal according to the work state of the operating system;
      a switch chip electrically coupled between the first ROM and the PCH chip;
      the switch chip receiving the switching signal from the PCH chip, wherein the switch chip controls whether the first ROM communicates with the PCH chip;
   wherein when the operating system of the storage unit is in an abnormal state, the second ROM controls the PCH chip to output the switching signal at a high-voltage level to turn on the switch chip, wherein the first ROM communicates with the PCH chip, and the PCH chip recovers the operating system from the first ROM; and
   wherein when the operating system of the storage unit is in an normal state, the second ROM controls the PCH chip to output the switching signal at a low-voltage level to turn off the switch chip, and the first ROM does not communicate with the PCH chip.

10. The recovery circuit of claim 9, wherein the recovery circuit further comprises a connector, and the PCH chip executes the operating system of the storage unit through the connector.

11. The recovery circuit of claim 10, wherein the connector is a serial advanced technology attachment (SATA).

12. The recovery circuit of claim 10, wherein a first signal pin, a second signal pin, and a third signal pin of the second ROM are electrically coupled to a first signal pin, a second signal pin, and a third signal pin of the PCH chip, respectively; a power pin of the first ROM is electrically coupled to a power supply, and is grounded through a first capacitor; wherein a first ground pin to a third ground pin of the connector are grounded, a first data pin is electrically coupled to a first data pin of the PCH chip through a second capacitor; wherein a second data pin is electrically coupled to a first data pin of the PCH chip through a third capacitor; wherein a third data pin is electrically coupled to a fourth data pin of the PCH chip through a fourth capacitor; and a fourth data pin is electrically coupled to a third data pin of the PCH chip through a fifth capacitor.

13. The recovery circuit of claim 12, wherein a first data pin, a second data pin, a third data pin, and a fourth data pin of the switch chip are electrically coupled to a first data pin, a second data pin, a third data pin, and a fourth data pin of the PCH chip, respectively; wherein a fifth data pin, a sixth data pin, a seventh data pin, and a eighth data pin of the switch chip are electrically coupled to a first data pin, a second data pin, a third data pin, and a fourth data pin of the first ROM, respectively; wherein a signal pin of the switch chip is electrically coupled to a general input and output pin of the PCH chip, to receive the switch control signal from the PCH chip; and wherein a power pin of the switch chip is electrically coupled to the power supply and is grounded through a sixth capacitor.

14. The recovery circuit of claim 13, wherein a power pin of the first ROM is electrically coupled to the power supply, and is grounded through a seventh capacitor.

15. The recovery circuit of claim 9, wherein the storage unit is a hard disk.

* * * * *